US007740516B2

United States Patent
del Castillo

(10) Patent No.: US 7,740,516 B2
(45) Date of Patent: Jun. 22, 2010

(54) ELECTRONIC SPEED CONTROL PROGRAMMING

(75) Inventor: Patrick D. del Castillo, Olathe, KS (US)

(73) Assignee: Castle Creations, Inc, Olathe, KS (US)

( * ) Notice: Subject to any disclaimer, the term of this patent is extended or adjusted under 35 U.S.C. 154(b) by 943 days.

(21) Appl. No.: 11/361,822

(22) Filed: Feb. 24, 2006

(65) Prior Publication Data

US 2006/0211328 A1 Sep. 21, 2006

Related U.S. Application Data

(60) Provisional application No. 60/656,047, filed on Feb. 24, 2005.

(51) Int. Cl.
*A63H 17/02* (2006.01)
(52) U.S. Cl. .......................................... 446/6
(58) Field of Classification Search ................ None
See application file for complete search history.

(56) References Cited

U.S. PATENT DOCUMENTS 4,964,837 A * 10/1990 Collier ....................... 446/409
5,252,873 A 10/1993 Hamamoto et al.
6,222,333 B1 4/2001 Garnett et al.
6,293,798 B1 * 9/2001 Boyle et al. ................... 434/29
6,439,956 B1 * 8/2002 Ho .............................. 446/454
6,949,002 B2 * 9/2005 Yamaguchi et al. .......... 446/454
7,010,628 B2 * 3/2006 Cloud et al. ................... 710/72

OTHER PUBLICATIONS

Futaba Digital Fet Servos; Jul. 1, 2001;1 page.
Phoenix-35, by Patrick Del Castillo of Castle Creations, Copyright 2002 (6 pages), Sep. 1, 2004.
Explanation of PHX-Link Settings, PHX-Link Software with Controller Plugged Into Link (5 pages), Mar. 26, 2004.
PHX-Link Installation Manual, Copyright 2004 by Patrick Del Castillo and Castle Creations, Mar. 26, 2004.
PHX-Link User's Guide, Copyright 2004 by Patrick Del Castillo and Castle Creations, Mar. 26, 2004.

* cited by examiner

*Primary Examiner*—Ronald Laneau
*Assistant Examiner*—Tramar Harper
(74) *Attorney, Agent, or Firm*—Shook, Hardy & Bacon, L.L.P.

(57) ABSTRACT

A method and apparatus for programming an electronic speed controller for a radio controlled model including a programmer for interfacing a personal computer to the RX port of the electronic speed controller. The electronic speed controller software may be updated, modified or replaced through the RX port.

9 Claims, 2 Drawing Sheets

ELECTRONIC SPEED CONTROL PROGRAMMING

This application claims the benefit of prior filed, Ser. No. 60/656,047, filed Feb. 24, 2005, entitled ELECTRONIC SPEED CONTROL PROGRAMMING.

FIELD OF THE INVENTION

The present invention relates to a method and apparatus for programming an electronic speed control and, more particularly, to a method and apparatus for programming an electronic speed control through an RX receive control port.

BACKGROUND OF THE INVENTION

Radio controlled models, such as airplanes, helicopters, boats and cars, are known in the art. Battery-powered RC models include a battery, a direct current (DC) motor, a radio receiver, and an electronic speed control. Electronic speed controls for DC motors typically include a microprocessor with a memory or firmware. Most electronic speed controls are preprogrammed at the manufacturer for a particular application and with a fixed set of instructions or functions. These electronic speed controls typically have no means for reprogramming the memory. Other electronic speed controls may include programmable memory such as EEPROM or flash memory and a dedicated programming port to enable updating of the software functions or to correct programming errors.

SUMMARY OF THE INVENTION

The present invention provides a method and apparatus for reprogramming an electronic speed control ("ESC") through the receive ("RX") port of an electric radio controlled model vehicle.

DETAILED DESCRIPTION

Figure 1:
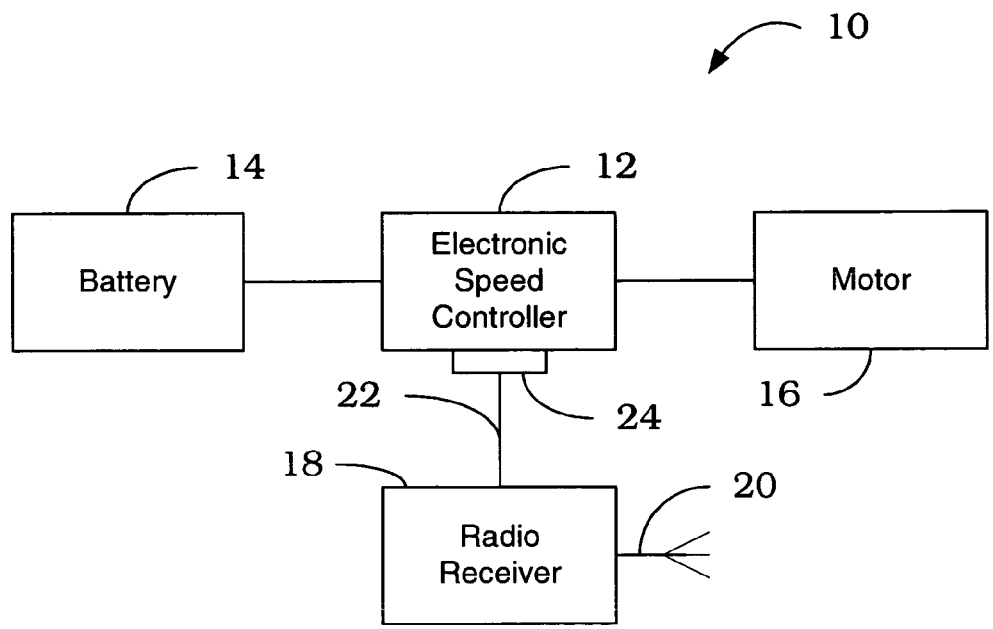
FIG. 1 is a functional block diagram of a radio controlled model control circuit.

Referring to FIG. 1, a block diagram of a radio controlled model control circuit is generally indicated by reference numeral 10. RC model control circuit 10 includes an electronic speed controller (ESC) 12, a power supply such as a battery 14, a DC motor 16 a radio receiver circuit 18 and an antenna 20. Radio receiver 18 is connected to the electronic speed controller 12 through line 22 and connector 24. In a typical application, the components of the radio controlled model control circuit 10 are mounted in a radio controlled model such as an airplane, for example. The antenna 20 and receiver 18 receive control commands from a transmitter (not shown) under the control of a user, and transmit the commands to the electronic speed controller 12 via line 22 through a three-pin connector 24. Electronic speed controller 12 includes a microprocessor, program memory and associated electronic components (not shown). In response to commands received from the receiver 18, the electronic speed controller 12 applies power from battery 14 to DC motor 16. Electronic speed controller 12 controls the timing and duration of voltage pulses applied to the DC motor 16 as necessary in response to the commands sent from the transmitter.

Figure 2:
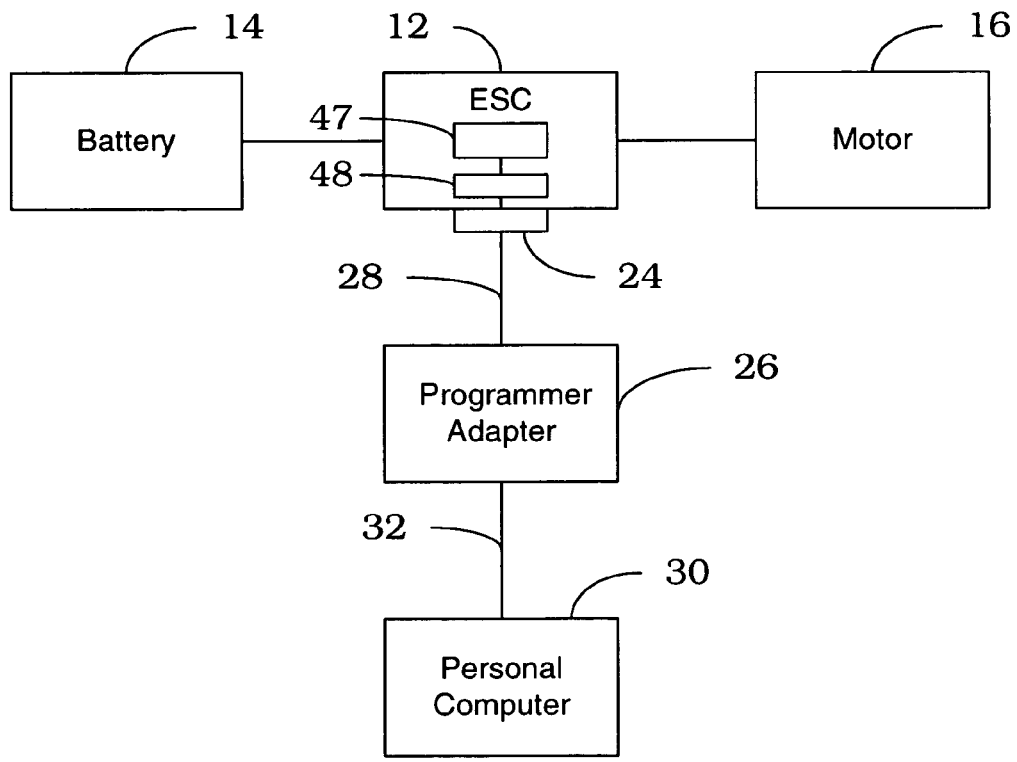
FIG. 2 is a functional block diagram of an electronic speed control circuit interfaced with a programmer.

Referring to FIG. 2, a programmer adapter 26 may be connected to the electronic speed controller 12 using the same connector 24 and an adapter cable 28 to reprogram the electronic speed controller 12, discussed in detail hereinbelow. Programmer 26 may connect to a USB or serial port, for example, on a personal computer 30 via cable 32.

Figure 3:
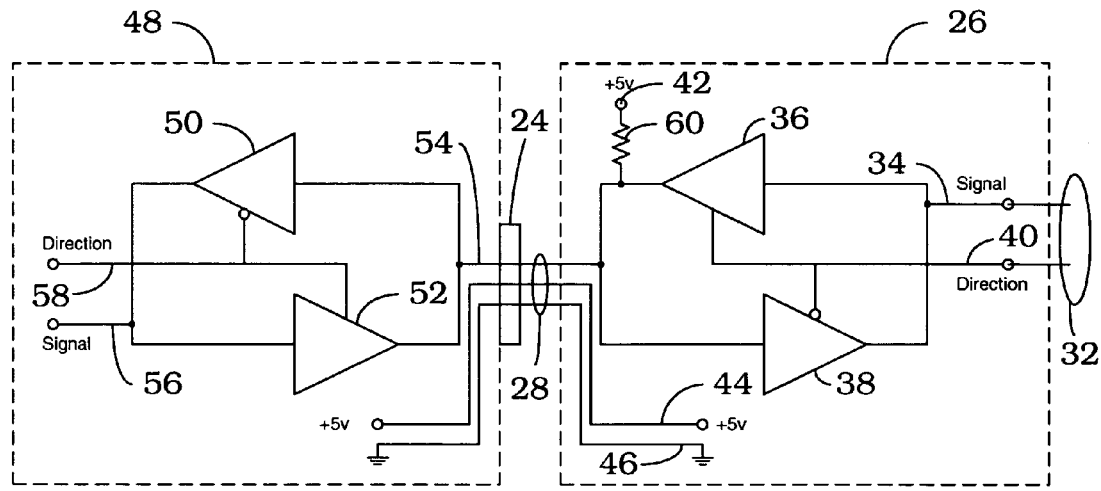
FIG. 3 is a circuit diagram of the ESC programmer interface.

In greater detail referring to FIGS. 2 and 3, programmer 26 includes a bidirectional signal line 34 connected to a send buffer 36 and a receive buffer 38. A directional signal line 40 is connected to each of the buffers 36 and 38 to enable or disable the respective buffer. Power on lines 42 and 44 and ground on line 46 may be provided through the USB cable 32 from the USB port on the personal computer 30, or may be supplied by the battery 14 connected to ESC 12, for example.

The electronic speed controller 12 includes a microprocessor 47, and an ESC interface 48. The ESC interface 48 includes a buffer circuit similar to the buffer circuit for the programmer 26. A receive buffer 50 and a send buffer 52 are connected to a bidirectional signal line 54 from programmer 26 and a signal line 56 from the microprocessor 47. A direction signal line 58 is connected to each of the buffers 50 and 52 to enable or disable the respective buffer.

To reprogram the firmware in the ESC 12, the battery 14 may be disconnected from the ESC 12. The programmer 26 is connected to a USB or serial port of computer 30 with cable 32. Cable 28 is then connected to connector 24 of the ESC 12.

When power is applied to the ESC 12 on line 44, the ESC 12 determines the function of the port 24, i.e., whether it is connected to the receiver 18 or connected to the programmer 26. If the signal on line 54 is an activation signal such as a consistent high voltage, then the ESC 12 is connected to the programmer 26 and will enter a programming mode. The consistent high level is generated by the pull-up resistor 60 on line 42 and connected to line 54. If a high voltage signal is not detected by the ESC 12 on line 54, then the ESC 12 is connected to the receiver 18 and will use the port 24 as a normal, unidirectional RX port by setting the direction line 58 on the ESC 12 low. The power 44 and ground 46 lines through the RX port 24 are used to power the ESC 12 and set a consistent ground level.

Once the ESC 12 enters the programming mode, the signal line 54 is treated as a single wire bidirectional bus. The PC 30 initiates all communications with the ESC 12 through the programmer 26. Either the ESC 12 or the programmer 26 may put data on line 54 by actively pulling it to ground to indicate a low signal or by going into a high-Z state and allowing the pull-up resistor 60 on line 42 to pull the line 54 to a high signal level. Because there is no common clock signal between the ESC 12 and the PC 30, data is input on line 54 and read from line 54 in a predetermined sequence. The PC 30 is responsible for negotiations and control of the ESC 12.

Communication over the bus 54 is accomplished using data packets. All packets begin with a synchronization start field, followed by a packet identifier. The packet identifier indicates the type of packet such as a token, data or handshake, for example. An address field specifies the function, via its address, that is either the source or destination of a data packet, followed by the endpoint field. A data field includes an integral number of bytes depending on the packet identifier. A cyclic redundancy check or checksum field is used to ensure that the data is transmitted and received correctly.

When power is detected by the ESC 12 on line 54, the ESC 12 sends out a start or connect byte of data on line 54 and waits for a response from PC 30. If a response is not received within a predetermined amount of time, such as 10 milliseconds for example, the ESC 12 sends another byte of data on line 54. This continues until the PC 30 responds or a maximum number of retries is exceeded, for example.

More particularly, when the programmer 26 is initially connected to the ESC 12 through RX port 24, the PC 30 waits to receive the start or connect byte from the ESC 12. Once the start or connect byte is received, the PC 30 sends a 16-byte data packet to the ESC 12.

Typically, the first data packet includes instructions to reprogram or update the communication software on the ESC 12, for example. Once the task is completed, the ESC 12 sends an acknowledgment along with a checksum. If the checksum is incorrect, the PC 30 ignores the response from the ESC 12 and sends the same data packet again.

Once the communication software in the ESC 12 is updated, if necessary, the motor controller software may be updated. Some of the commands that may be sent from the PC 30 to the ESC 12 include Erase Flash to erase the contents of the flash memory beginning at a specified memory address and Program Flash to program the flash memory with program data beginning at a specified memory address, for example.

Using the RX port 24 and programmer 26 interface, program parameters or settings stored in the firmware on the ESC 12 may be modified using software loaded on the personal computer 30. Parameters such as the cutoff voltage, cutoff type, brake type, throttle type, soft start, motor settings, current, pulse frequency and rotation direction may be modified or adjusted, for example.

User upgradeable firmware on the ESC 12 allows the user to incorporate product improvements into existing controllers without returning the controller to the manufacturer or purchasing another controller. The user may add new functionality to the controller for a specific application or may reconfigure the controller for another application and use such as changing from airplane firmware to helicopter or race car firmware, for example. Additionally, bug fixes and upgrades may be easily, quickly and inexpensively distributed to end users.

Figure 4:
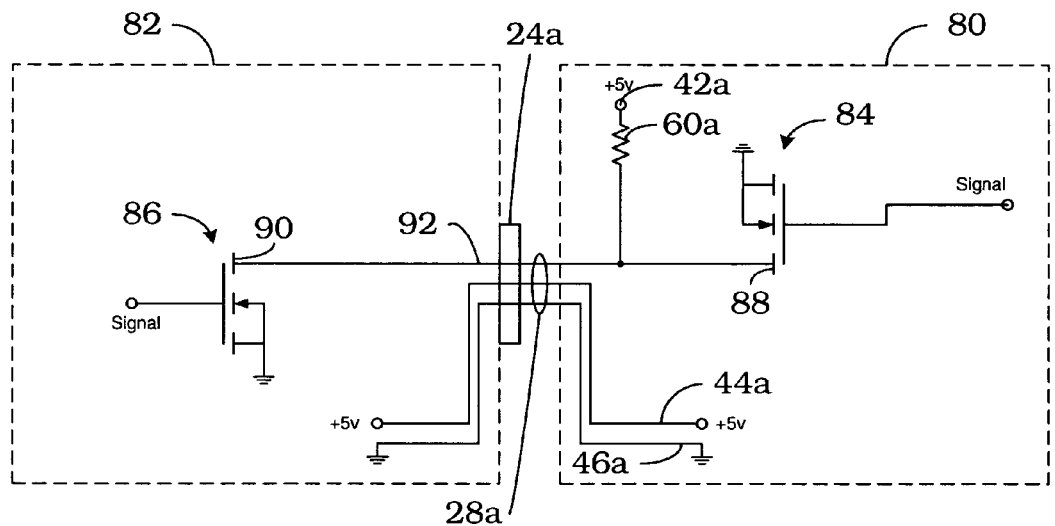
FIG. 4 is a circuit diagram of another embodiment of the ESC programmer interface.

Referring to FIG. 4, another embodiment of an ESC programmer interface circuit is illustrated. In both the programmer 80 and ESC 82, a MOS FET transistor 84 and 86, respectively, each with an open drain output 88 and 90, respectively, is used to drive an RX signal line 92. Components corresponding in function to components designated in FIGS. 1-3 are designated with the same reference numerals with the addition of the "a" notation. As described hereinabove for line 54, line 92 is a bidirectional bus for communication between the ESC 12 and the PC 30.

It should be understood that while certain forms of this invention have been illustrated and described, it is not limited thereto except insofar as such limitations are included in the following claims.

Having thus described the invention, what is claimed as new and desired to be secured by Letters Patent is as follows:

1. One or more computer readable media having microprocessor-usable instructions embodied thereon that, when executed, perform a method for controlling a radio controlled vehicle having a battery and a motor, said method comprising:
   enabling an electronic speed controller having a microprocessor and a radio receiver port located in the radio controlled vehicle to perform:
   applying power received from the battery to the motor of the radio controlled vehicle by controlling timing and duration of voltage pulses based on updated parameters stored in the microprocessor,
   wherein said parameters are updated by monitoring a wired interface from the radio receiver port, by determining a signal is present indicating a programming mode, and by communicating through said radio receiver port wired to a personal computer to receive replacement parameters from the personal computer.

2. The one or more computer readable media of claim 1, wherein said replacement parameters comprise one or more of soft start, throttle type, brake type, motor settings, pulse frequency and rotation direction.

3. The one or more computer readable media of claim 1, further comprising receiving command instructions including instructions operable to perform functions comprising one or more of communications, motor control, erase flash memory, product improvement, product upgrade and reconfiguration of motor control application.

4. The one or more computer readable media of claim 1, wherein said radio receiver port comprises a bidirectional line.

5. The computer readable media of claim 1 wherein said radio receiver port is a three wire interface, and wherein one of the three wires is the bidirectional line.

6. The computer readable media of claim 1 wherein said determining occurs at boot-up of said microprocessor.

7. One or more computer readable media having microprocessor-usable instructions embodied thereon that, when executed, perform a method comprising:
   enabling an electronic speed controller having a microprocessor and a radio receiver port located in a radio controlled vehicle to perform the steps of:
   monitoring a wired interface from the radio receiver port,
   determining a signal is present indicating a programming mode,
   updating parameters of microprocessor firmware by communicating through a wired connection of said radio receiver port with a personal computer to receive replacement parameters from the personal computer, and
   utilizing said microprocessor firmware and said replacement parameters to apply power received through a battery to a motor of the radio controlled vehicle by controlling timing and duration of voltage pulses.

8. The one or more computer readable media of claim 7, wherein said replacement parameters comprise one or more of soft start, throttle type, brake type, motor settings, pulse frequency and rotation direction.

9. The one or more computer readable media of claim 7, wherein said radio receiver port is a three wire interface, and wherein one of the three wires is the bidirectional line.

* * * * *